(12) United States Patent
Choi

(10) Patent No.: US 11,143,115 B2
(45) Date of Patent: Oct. 12, 2021

(54) GAS TURBINE SYSTEM AND CONTROL APPARATUS AND METHOD THEREOF

(71) Applicant: DOOSAN HEAVY INDUSTRIES & CONSTRUCTION CO., LTD., Changwon-si (KR)

(72) Inventor: Byung Hee Choi, Yongin-si (KR)

( * ) Notice: Subject to any disclaimer, the term of this patent is extended or adjusted under 35 U.S.C. 154(b) by 277 days.

(21) Appl. No.: 15/953,408

(22) Filed: Apr. 14, 2018

(65) Prior Publication Data
US 2018/0306124 A1    Oct. 25, 2018

(30) Foreign Application Priority Data
Apr. 24, 2017  (KR) .......................... 10-2017-0052386

(51) Int. Cl.
*F02C 9/54* (2006.01)
*F02C 9/28* (2006.01)
(Continued)

(52) U.S. Cl.
CPC ............ *F02C 9/54* (2013.01); *F02C 7/22* (2013.01); *F02C 9/20* (2013.01); *F02C 9/28* (2013.01); *F02C 9/26* (2013.01)

(58) Field of Classification Search
CPC .... F02C 9/20; F02C 9/26; F02C 9/263; F02C 9/28; F02C 9/54; F05D 2270/02;
(Continued)

(56) References Cited

U.S. PATENT DOCUMENTS

| | | | | | |
|---|---|---|---|---|---|
| 4,299,088 A | * | 11/1981 | Rowen | ...................... | F02C 9/54 60/39.27 |
| 10,487,732 B2 | * | 11/2019 | Takahashi | ................ | F02C 9/56 |

(Continued)

FOREIGN PATENT DOCUMENTS

JP    S63-134825 A    6/1988
JP     06323165 A    11/1994
(Continued)

OTHER PUBLICATIONS

A Japanese Office Action dated Apr. 2, 2019 in connection with Japanese Patent Application No. 2018-062587.
(Continued)

*Primary Examiner* — William H Rodriguez
(74) *Attorney, Agent, or Firm* — Harvest IP Law, LLP

(57) ABSTRACT

A gas turbine system can estimate an amount of compressed air supplied to a combustor and limit a fuel amount according to the estimated compressed air amount. A control apparatus of the system includes a sensing unit to measure the turbine rotor speed; a compressed air amount estimation unit to estimate a change rate $M_R$ of an amount of compressed air produced by the compressor and supplied to the combustor, based on the measured turbine rotor speed; and a fuel amount control unit to control a fuel amount $F_C$ supplied to the combustor, based on the estimated change rate $M_R$. The control apparatus can preemptively control the fuel amount in response to variations in the compressed air amount by a momentarily changing turbine rotor speed and can limit the turbine inlet temperature to below the maximum allowable temperature, to protect the turbine and/or combustor against fluctuations in compressed air amount.

8 Claims, 3 Drawing Sheets

(51) Int. Cl.
*F02C 9/20* (2006.01)
*F02C 7/22* (2006.01)
*F02C 9/26* (2006.01)

(58) Field of Classification Search
CPC .......... F05D 2270/024; F05D 2270/03; F05D 2270/06; F05D 2270/061; F05D 2270/112; F05D 2270/304; F05D 2270/309; F05D 2270/313; F05D 2270/44; F05D 2270/71
See application file for complete search history.

(56) References Cited

U.S. PATENT DOCUMENTS

| | | | | |
|---|---|---|---|---|
| 2004/0011051 | A1* | 1/2004 | Ryan | F02C 9/28 60/773 |
| 2004/0055273 | A1* | 3/2004 | Hirayama | F02C 9/54 60/39.281 |
| 2005/0109033 | A1* | 5/2005 | Braun | F02C 9/20 60/772 |
| 2005/0131616 | A1* | 6/2005 | Fujii | F02C 9/28 701/100 |
| 2007/0031238 | A1* | 2/2007 | Fujii | F04D 27/0246 415/48 |
| 2010/0005808 | A1* | 1/2010 | Nanataki | F02C 9/54 60/773 |
| 2010/0180604 | A1* | 7/2010 | Kawai | F02C 7/26 60/778 |
| 2011/0037276 | A1* | 2/2011 | Hoffmann | F02C 9/28 290/40 C |
| 2012/0017600 | A1* | 1/2012 | Saito | F02C 3/10 60/773 |
| 2012/0167581 | A1* | 7/2012 | Pesce | F01K 23/14 60/773 |
| 2013/0118146 | A1* | 5/2013 | Nanataki | F02C 9/00 60/39.182 |
| 2014/0000272 | A1* | 1/2014 | Fichtner | F02C 9/20 60/773 |
| 2014/0053567 | A1* | 2/2014 | Langenbacher | F02C 9/26 60/773 |
| 2014/0156165 | A1* | 6/2014 | Ewens | F02C 9/20 701/100 |
| 2014/0325990 | A1* | 11/2014 | Takeda | F01K 21/047 60/775 |
| 2014/0352320 | A1* | 12/2014 | Nanataki | F02C 9/18 60/774 |
| 2015/0135722 | A1* | 5/2015 | Takahashi | F02C 3/10 60/774 |
| 2015/0171705 | A1* | 6/2015 | Hino | H02J 13/0006 290/1 A |
| 2016/0245172 | A1* | 8/2016 | Myoren | F02C 9/20 |
| 2017/0002748 | A1 | 1/2017 | Sonoda et al. | |
| 2017/0145925 | A1* | 5/2017 | Kusumi | H02J 3/386 |
| 2017/0159562 | A1* | 6/2017 | Takahashi | F02C 3/305 |
| 2017/0175567 | A1* | 6/2017 | Talukdar | G05B 23/0243 |
| 2017/0284308 | A1* | 10/2017 | Myoren | F02C 3/10 |
| 2018/0306111 | A1* | 10/2018 | Choi | F02C 9/20 |
| 2018/0306122 | A1* | 10/2018 | Choi | F02C 9/18 |
| 2018/0316293 | A1* | 11/2018 | Choi | H02P 9/04 |

FOREIGN PATENT DOCUMENTS

| | | |
|---|---|---|
| JP | H06323165 A | 11/1994 |
| JP | 2012041919 A | 3/2012 |
| JP | 2016014371 A | 1/2016 |
| JP | 2016-037883 A | 3/2016 |

OTHER PUBLICATIONS

An European Search Report dated Sep. 25, 2018 in connection with European Patent Application No. 18168367.3.
A Korean Office Action dated Aug. 30, 2018 in connection with Korean Patent Application No. 10-2017-0052386.
English Translation of the Korean Office Action dated Aug. 30, 2018 in connection with Korean Patent Application No. 10-2017-0052386 which corresponds to the above-referenced U.S. application.

* cited by examiner

[FIG. 2]

GAS TURBINE SYSTEM AND CONTROL APPARATUS AND METHOD THEREOF

CROSS-REFERENCE TO RELATED APPLICATIONS

This application claims priority to Korean Patent Application No. 10-2017-0052386, filed on Apr. 24, 2017, the disclosure of which is incorporated herein by reference in its entirety.

BACKGROUND OF THE INVENTION

Field of the Invention

Exemplary embodiments of the present invention relate to a gas turbine system and a control apparatus and method thereof, and more particularly, to a gas turbine system which can estimate an amount of compressed air to be supplied to a combustor in response to a momentary change in system frequency and can limit a fuel amount according to the estimation, thereby stably performing temperature control, and an apparatus and method of controlling the system.

Description of the Related Art

In general, an engine or apparatus including a turbine such as a gas turbine or steam turbine is a power generation system for converting thermal energy of gas or fluid into a rotational force as mechanical energy, and includes a rotor axially rotated by gas or fluid and a stator supporting and surrounding the rotor.

A gas turbine which is used in a power station or the like in order to produce electricity may include a compressor, a combustor and a turbine. The compressor compresses air and supplies high-pressure air to the combustor, the combustor produces combustion gas, and the turbine is driven by the combustion gas discharged from the combustor.

In general, the compressor of the gas turbine is coupled to a shaft of the turbine and is axially rotated with the turbine. While being axially rotated, the compressor sucks air from the outside and compresses the air. The compressed air is supplied to the combustor, which combusts the compressed air by mixing fuel with the compressed air. Thus, the combustor produces high-temperature, high-pressure combustion gas and supplies it to the turbine. The high-temperature, high-pressure combustion gas supplied to the turbine rotates rotor blades of the turbine, thereby rotating the rotor of the turbine.

In general, since the rotation of the turbine rotor is tied to the frequency of the system, the rotational speed (expressed in revolutions per minute, or rpm) of the rotor is changed according to a change of the system frequency. When the system frequency is significantly lowered in such a system, the rotor speed is reduced, and the amount of compressed air produced by the compressor connected to the same shaft is also reduced.

When the amount of compressed air produced by the compressor is reduced, the amount of compressed air supplied to the combustor is inevitably reduced, and the combustor should perform combustion using a smaller amount of compressed air. Thus, a turbine inlet temperature may suddenly rise. In general, the rise of the turbine inlet temperature in the gas turbine system operated at the maximum allowable turbine inlet temperature may have an adverse influence on components of the turbine and/or the combustor.

SUMMARY OF THE INVENTION

The present invention has been made in view of the above problems, and it is an object of the present invention to provide a gas turbine system and a control apparatus and method thereof, which can preemptively control a fuel amount in response to a change of a compressed air amount by a momentary change in system frequency.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a control apparatus of a gas turbine system which includes a compressor configured to produce compressed air by sucking and compressing external air, a combustor configured to produce high-temperature high-pressure combustion gas by combusting the compressed air and fuel, and a turbine including a rotor rotated by the combustion gas produced through the combustor, wherein the compressor and the turbine are coaxially connected and a speed of the turbine rotor is proportional to a system frequency. The control apparatus may include a sensing unit configured to measure the turbine rotor speed; a compressed air amount estimation unit configured to estimate a change rate $M_R$ of an amount of compressed air which is produced by the compressor and supplied to the combustor, based on the measured turbine rotor speed; and a fuel amount control unit configured to control a fuel amount $F_C$ supplied to the combustor, based on the estimated change rate $M_R$.

The change rate $M_R$ of the compressed air amount may be estimated according to $$M_R = \frac{N_C}{N_N} - 1,$$

where $N_C$ denotes the measured turbine rotor speed, and $N_N$ denotes the turbine rotor speed when the system frequency is a rated frequency.

The sensing unit may be further configured to measure at least one parameter of an inlet temperature of the compressor and a position of an inlet guide vane for inducing air to the compressor, and the compressed air amount estimation unit may be further configured to correct the estimated change rate $M_R$ according to the measured parameter.

The sensing unit may be further configured to measure the amount of compressed air which is produced by the compressor and supplied to the combustor, and the compressed air amount estimation unit may be further configured to correct the estimated change rate $M_R$, based on the measured compressed air amount. The compressed air amount may be measured using at least one parameter of an inlet temperature of the compressor, a position of an inlet guide vane for inducing air to the compressor, and the turbine rotor speed, and the compressed air amount estimation unit may be further configured to store the compressed air amount in a database and to correct the estimated change rate $M_R$, based on data stored in the database.

The fuel amount control unit may set the fuel amount $F_C$ supplied to the combustor according to a calculation of $F_C = F_N(1+M_R)$, where $F_N$ denotes the amount of fuel supplied to the combustor when the system frequency was the rated frequency, and $M_R$ denotes the change rate of the compressed air amount.

In accordance with another aspect of the present invention, a gas turbine system for power generation may include a compressor configured to produce compressed air by sucking and compressing external air; a combustor configured to produce high-temperature high-pressure combustion gas by combusting the compressed air and fuel; a turbine including a rotor rotated by the combustion gas produced through the combustor; and the above control apparatus configured to control an amount of fuel supplied to the combustor.

In accordance with another aspect of the present invention, there is provided a control method of a gas turbine system which includes a compressor configured to produce compressed air by sucking and compressing external air, a combustor configured to produce high-temperature high-pressure combustion gas by combusting the compressed air and fuel, and a turbine including a rotor rotated by the combustion gas produced through the combustor, wherein the compressor and the turbine are coaxially connected and a speed of the turbine rotor is proportional to a system frequency. The control method may include measuring the turbine rotor speed; estimating a change rate $M_R$ of an amount of compressed air supplied to the combustor depending on a change in the measured turbine rotor speed; and controlling an amount of fuel supplied to the combustor according to the estimated change rate $M_R$. Here, controlling may include setting the fuel amount $F_C$ supplied to the combustor according to a calculation of $F_C=F_N(1+M_R)$, where $F_N$ denotes the amount of fuel supplied to the combustor when the system frequency was the rated frequency, and $M_R$ denotes the change rate of the compressed air amount.

The control method may further include measuring at least one parameter of an inlet temperature of the compressor and a position of an inlet guide vane for inducing air to the compressor, and correcting the estimated change rate $M_R$ according to the measured parameter. Alternatively, the control method may further include measuring the amount of compressed air which is produced by the compressor and supplied to the combustor, and correcting the estimated change rate $M_R$, based on the measured compressed air amount. Here, the compressed air amount may be measured using at least one parameter of an inlet temperature of the compressor, a position of an inlet guide vane for inducing air to the compressor, and the turbine rotor speed, and the method may further storing the compressed air amount in a database, and correcting the estimated change rate $M_R$, based on data stored in the database.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
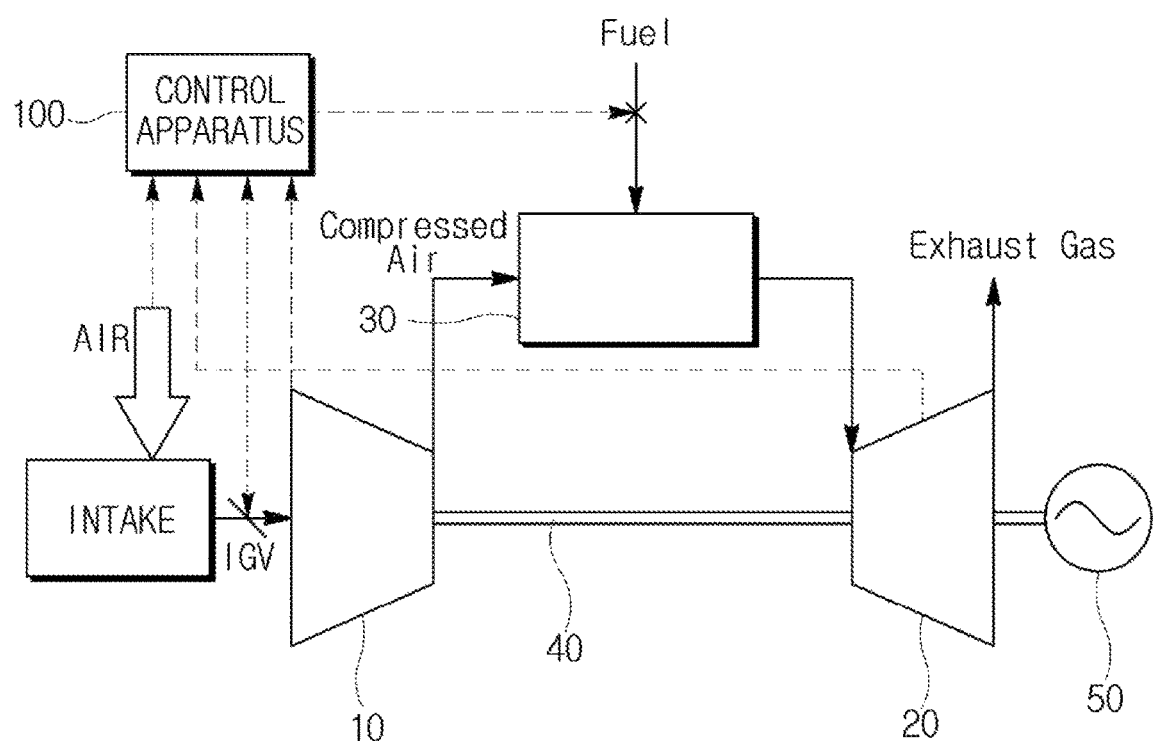
FIG. 1 is a block diagram of a gas turbine system according to an embodiment of the present invention.

In order to clearly describe the present invention, elements irrelevant to the descriptions will be omitted. Throughout the specification, the same or like components are represented by the same reference numerals.

In this specification, when an element is referred to as being "connected" to another element, it may not only indicate that the former element is "directly connected" to the latter element, but also indicate that the former element is "electrically connected" to the latter element with another element interposed therebetween. Moreover, when an element is referred to as "including" a component, it may indicate that the element does not exclude another component but can further include another component, unless referred to the contrary.

When an element is referred to as being disposed "over" another element, it may indicate that the former element is disposed immediately over the latter element or another element is interposed therebetween. However, when an element is referred to as being disposed "immediately over" another element, it may indicate that no elements are interposed therebetween.

The terms such as first, second and third are used to describe various parts, components, regions, layers and/or sections, but are not limited thereto. Those terms are only used to distinguish a part, component, region, layer or section from another part, component, region, layer or section. Therefore, a first part, component, region, layer or section in the following descriptions may be referred to as a second part, component, region, layer or section without departing the scope of the present invention.

The technical terms used in this specification are only used to describe a specific embodiment, but not intended to limit the present invention. The terms of a singular form used herein may include plural forms unless referred to the contrary. The meaning of the term "including" used in this specification specifies a characteristic, region, integer, step, operation, element and/or component, and does not exclude the presence or addition of another characteristic, region, integer, step, operation, element and/or component.

The terms such as "under" and "above", indicating spatial relations, may be used to more easily describe the relation between one part and another part in the drawings. Such terms are intended to include not only meanings intended in the drawings, but also other meanings or operations of an apparatus in use. For example, when an apparatus in a drawing is turned over, certain parts which have been described as being disposed "under" other parts may be described as being disposed "over" the other parts. Therefore, the exemplary term "under" may include both directions of over and under. The apparatus may be rotated at an angle of 90° or another angle, and the terms indicating spatial relations may be analyzed according to the rotation.

Although not defined differently, all terms including the technical terms and scientific terms used herein have the same meanings as those understood by a person skilled in the art to which the present invention pertains. The terms defined in a generally used dictionary may be additionally analyzed as meanings which coincide with the related technical documents and the contents disclosed in this specification, and not analyzed as ideal or formal meanings unless they are not defined.

Hereafter, exemplary embodiments of the present invention will be described with reference to the accompanying drawings, such that the present invention can be easily carried out by those skilled in the art to which the present invention pertains. However, the present invention can be embodied in various manners, and is not be limited to the embodiments described herein.

FIG. 1 illustrates a gas turbine system according to an embodiment of the present invention.

Referring to FIG. 1, the gas turbine system may include a compressor 10, a turbine 20, a combustor 30, a single shaft 40, a power generator 50, and a control apparatus 100.

The compressor 10 may perform a function of producing high-pressure compressed air by sucking and compressing external air. The compressed air may be transferred to the combustor 30.

The combustor 30 may inject fuel into the compressed air transferred from the compressor 10 and combust the fuel-air mixture to generate high-pressure, high-temperature combustion gas for output to the turbine 20. The high-pressure, high-temperature combustion gas supplied to the turbine 20 rotates rotor blades of the turbine, thereby rotating a rotor of the turbine 20. The temperature and pressure of the combustion gas supplied to the turbine 20 are lowered while the combustion gas drives the rotor blades of the turbine. Then, the combustion gas is discharged as exhaust gas to the atmosphere.

Since the turbine 20 and the compressor 10 are fixed to one shaft 40, while the rotor of the turbine 20 is rotated as described above, the compressor 10 is also rotated to compress air.

The power generator 50 may generate power using the rotation of the rotor of the turbine 20.

In the gas turbine system as described above, a method for regulating the rotational speed of the rotor of the turbine 20 may be divided into a load limit control method and a governor free control method. The load limit control method refers to a method that fixes the rotational speed of the rotor of the turbine 20 at a constant speed, and the governor free control method refers to a method that automatically controls the rotational speed of the rotor of the turbine 20 according to a frequency change of a power system. In general, a system frequency for stable operation of the entire power system needs to be retained at the rated frequency (60 Hz in the case of Korea). Therefore, in consideration of facility protection, operators of gas turbine systems prefer the load limit control method, which can prevent a sudden fluctuation of the gas turbine system. However, the "power market operation rule" applicable to power generation companies, as set by the Korea Power Exchange that oversees stable operations of the country's entire power system, obliges member companies to "actively cooperate to retain the system frequency through governor free operation." Thus, gas turbine systems are generally operated according to the governor free control method.

When the gas turbine system is operated according to the governor free control method, the rotor of the turbine 20 is rotated at a rotational speed proportional to the system frequency. Furthermore, since the turbine 20 and the compressor 10 are connected to each other through one shaft 40, the compressor 10 generates compressed air in proportion to the rotational speed of the rotor of the turbine 20, as typically expressed in revolutions per minute, i.e., rpm units, and hereinafter referred to as rotor speed.

In such an environment, the gas turbine system may generate a smaller amount of power than a load. In this case, when the system frequency is decreased, the rotor speed is reduced in proportion to the decrease of the system frequency. As a result, the amount of compressed air produced by the compressor 10 is reduced in proportion to the reduction in rotor speed. Then, the amount of compressed air supplied to the combustor 30 may be reduced. Unless the amount of fuel mixed in the combustor 30 is controlled, the turbine inlet temperature may rise due to the reduction in amount of compressed air.

On the other hand, when the system frequency is increased, the rotor speed is increased in proportion to the increase of the system frequency. As a result, the amount of compressed air produced by the compressor 10 is increased in proportion to the increase in rotor speed. Then, the amount of compressed air supplied to the combustor 30 may be increased. Unless the amount of fuel mixed in the combustor 30 is controlled, the turbine inlet temperature may drop due to the increase in amount of compressed air. The drop of the turbine inlet temperature may lower the efficiency of the gas turbine system.

In order to prevent such a problem, the control apparatus 100 of the gas turbine system according to the embodiment of the present invention can estimate the amount of compressed air supplied to the combustor, and control the amount of fuel supplied to the combustor based on the estimated compressed air amount.

Figure 2:
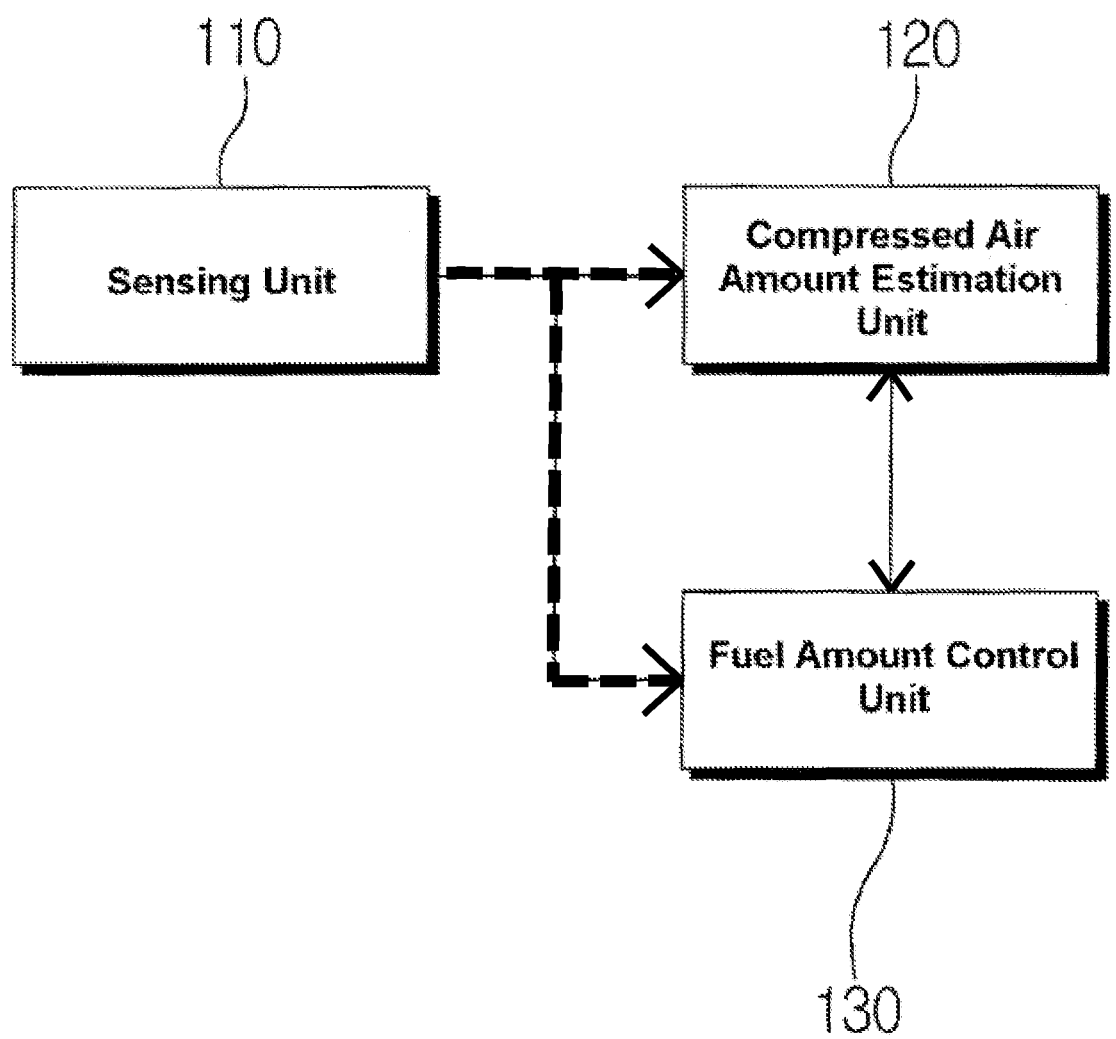
FIG. 2 is a block diagram of the control apparatus of FIG. 1.

FIG. 2 shows a control apparatus 100 according to an embodiment of the present invention.

Referring to FIG. 2, the control apparatus 100 may include a sensing unit 110, a compressed air amount estimation unit 120, and a fuel amount control unit 130.

The sensing unit 110 may measure a rotor speed of the turbine 20, expressed in rpm units. In addition, the sensing unit 110 may measure an amount of compressed air supplied to the combustor 30, an inlet temperature of the compressor 10, and the position of an inlet guide vane (IGV) for inducing air to the compressor 10.

The compressed air amount estimation unit 120 estimates the amount of compressed air supplied to the combustor 30 based on the rotor speed of the turbine 20, as acquired by the sensing unit 110. More specifically, with reference to the below Equation 1, the compressed air amount estimation unit 120 may measure a rotor speed $N_N$ of the turbine 20 and store the measured value ($N_N$) in a database readable by the control apparatus 100. A compressed air amount $M_N$ supplied to the combustor 30, when the system frequency is the rated frequency of 60 Hz. At this time, the compressed air amount supplied to the combustor 30 may be changed depending on the inlet temperature of the compressor 10 and the position of the inlet guide vane.

When the rotor speed of the turbine 20 changes to a value of $N_C$ due to a change of the system frequency, the compressed air amount supplied to the combustor 30 may be estimated as an amount $M_C$, as expressed by Equation 1 below.

$$M_C = M_N \times \frac{N_C}{N_N} \qquad \text{[Equation 1]}$$

According to Equation 1, when the rotor speed decreases, the compressed air amount estimation unit 120 may estimate that the compressed air amount $M_C$ supplied to the combustor 30 will decrease. On the other hand, when the rotor speed increases, the compressed air amount estimation unit 120 may estimate that the compressed air amount $M_C$ supplied to the combustor 30 will increase.

A change rate $M_R$ of the decreasing or increasing compressed air amount, i.e., a positive or negative rate of change, may be calculated through Equation 2 below.

$$M_R = \frac{M_C - M_N}{M_N} = \frac{N_C}{N_N} - 1 \quad \text{[Equation 2]}$$

A change rate $M_R$ of the compressed air amount that is greater than zero indicates that the compressed air amount increases. Conversely a change rate $M_R$ of the compressed air amount that is less than zero indicates that the compressed air amount decreases. The change rate may be verified based on the compressed air amount measured by the sensing unit 110, and can be corrected when the calculated change rate represents an error.

The change rate $M_R$ of the compressed air amount may be changed by the inlet temperature of the compressor 10 and/or the position of the inlet guide vane. Therefore, the compressed air amount estimation unit 120 may correct the change rate $M_R$ of the compressed air amount according to the inlet temperature of the compressor 10 and/or the position of the inlet guide vane, which may both be measured by the sensing unit 110.

In addition, the compressed air amount estimation unit 120 may use at least one parameter of the inlet temperature of the compressor 10, the position of the inlet guide vane, and the rotor speed of the turbine 20, to ascertain the amount of compressed air for a specific parameter. In doing so, the amount of compressed air being produced by the compressor 10 and supplied to the combustor 30 is ascertained by the compressed air amount estimation unit 120 through a simulation or through a measurement performed by the sensing unit 110. Then, the compressed air amount estimation unit 120 may store, in a database (not shown), information or a value indicative of the ascertained amount of compressed air. The control apparatus 100 may read a compressed air amount for a current parameter from the database based on the data stored in the database, and verify and correct the change rate $M_R$ of the compressed air amount, which is estimated by the compressed air amount estimation unit 120.

Based on the estimated change rate $M_R$ of the decreasing or increasing compressed air amount, the fuel amount control unit 130 may control a fuel amount $F_C$ supplied to the combustor 30, setting the controlled amount to an amount as calculated by Equation 3 below.

$$F_C = F_N(1 + M_R) \quad \text{[Equation 3]}$$

In Equation 3, $F_N$ represents the amount of fuel which is supplied to the combustor 30 when the system frequency is the rated frequency.

Equation 3 shows that the amount of fuel supplied to the combustor 30 increases when the change rate $M_R$ of the compressed air amount is greater than zero, and decreases when the change rate $M_R$ of the compressed air amount is less than zero.

The control apparatus 100 of the gas turbine system according to the embodiment of the present invention can predict a change of the compressed air amount supplied to the combustor 30 in advance, based on the rotor speed of the turbine 20, and can increase or decrease the amount of fuel supplied to the combustor 30 as necessary, thereby preventing an increase of the turbine inlet temperature and/or preventing a reduction in efficiency of the gas turbine system.

Figure 3:
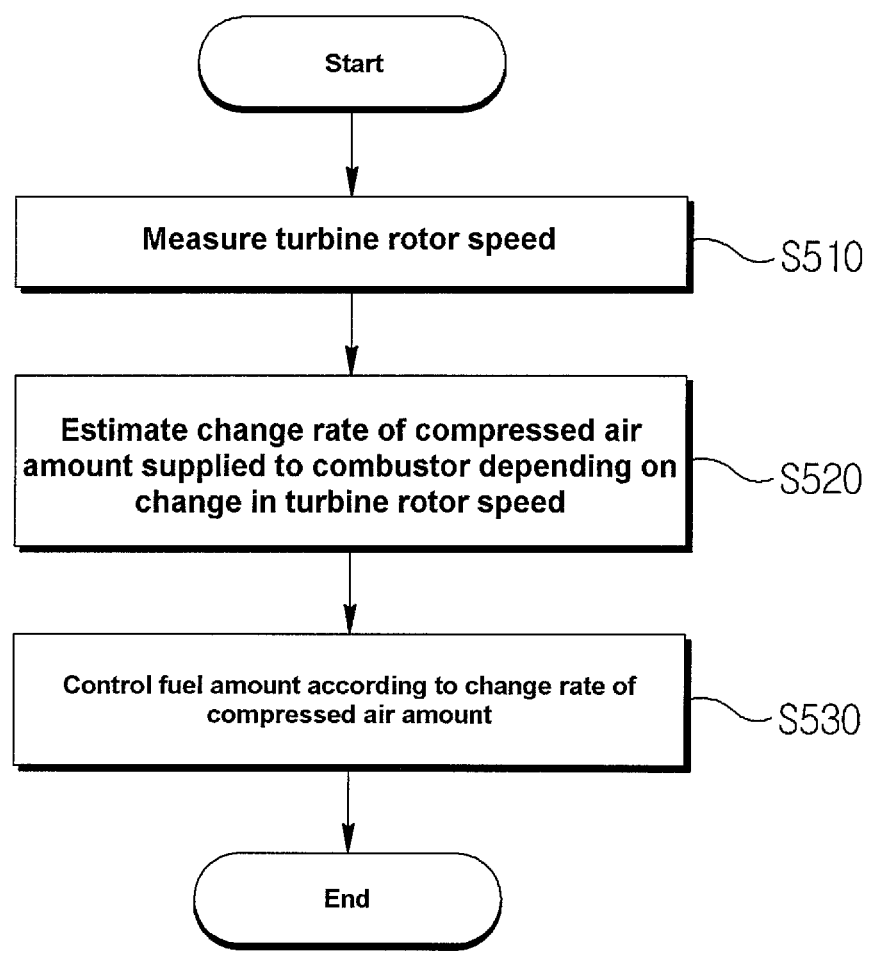
FIG. 3 is a flowchart illustrating a method for controlling an amount of fuel supplied to a combustor of the control apparatus according to an embodiment of the present invention.

FIG. 3 shows a method for controlling an amount of fuel supplied to the combustor of the control apparatus 100 according to an embodiment of the present invention.

Referring to FIG. 3, the control apparatus 100 may first measure a rotor speed of the turbine 20 in order to estimate a change in amount of compressed air supplied to the combustor, at step S510. Based on the measured rotor speed of the turbine 20, the control apparatus 100 may estimate a change rate of the compressed air amount supplied to the combustor, at step S520. As described with reference to Equation 2, when the change rate of the compressed air amount is greater than zero, it may indicate that the change rate increases. On the other hand, when the change rate of the compressed air amount is less than zero, it may indicate that the change rate decreases. According to the change rate estimated by the compressed air amount estimation unit 120 of the control apparatus 100, the fuel amount control unit 130 of the control apparatus 100 may control the amount of fuel supplied to the combustor 30, at step S530. That is, the fuel amount control unit 130 of the control apparatus 100 may increase or decrease the amount of fuel supplied to the combustor 30 according to the change rate of the compressed air amount estimated by the compressed air amount estimation unit 120.

The control apparatus and method according to the embodiments of the present invention can estimate a change of the compressed air amount supplied to the combustor 30 in advance according to a change of the system frequency, and preemptively deal with the change of the compressed air amount, thereby performing temperature control for preventing an increase of the turbine inlet temperature, which may occur due to a control process in the related art. The related art control process is performed through steps of a compressed air amount decrease, followed by a turbine inlet temperature rise, followed by an exhaust gas temperature rise, followed by a fuel amount reduction.

According to the embodiments of the present invention, the control apparatus and method can preemptively control the fuel amount in response to a variation of the compressed air amount by a change in turbine rotor speed (as tied to the system frequency) and can limit the turbine inlet temperature to less than the maximum allowable temperature, such that the variation of the compressed air amount does not have an adverse influence on the turbine and/or combustor. The control apparatus and method can also preemptively control the fuel amount in response to a variation of the compressed air amount by a change in turbine rotor speed, thereby preventing a reduction in efficiency of the gas turbine system.

While the present invention has been described with respect to the specific embodiments, it will be apparent to those skilled in the art that various changes and modifications may be made without departing from the spirit and scope of the invention as defined in the following claims.

What is claimed is:

1. A control method of a gas turbine system which includes a compressor configured to produce compressed air by sucking and compressing external air, a combustor configured to produce high-temperature high-pressure combustion gas by combusting the compressed air and fuel, and a turbine including a rotor rotated by the combustion gas produced through the combustor, wherein the compressor and the turbine are coaxially connected and a speed of the turbine rotor is proportional to a system frequency, the control method comprising:

measuring the speed of the turbine rotor;

estimating a change ratio $M_R$ of an amount of compressed air supplied to the combustor depending on a change in the measured speed of the turbine rotor; and controlling a fuel amount Fc supplied to the combustor according to the change ratio $M_R$, wherein the measuring includes measuring the amount of compressed air which is produced by the compressor and supplied to the combustor, measuring an inlet temperature of the compressor, and measuring a position of an inlet guide vane for inducing air to the compressor, wherein the estimating includes storing first data that is a calculated amount of compressed air according to the inlet temperature of the compressor, storing second data that is a calculated amount of compressed air according to the position of the inlet guide vane, and estimating the change ratio $M_R$ according to at least one of the first data and the second data, wherein the controlling includes correcting the change ratio $M_R$ of the amount of compressed air according to at least one of the first data and the second data.

2. The control method of claim 1, wherein the change ratio $M_R$ of the amount of the compressed air is estimated according to $$M_R = \frac{N_C}{N_N} - 1,$$

where Nc denotes the speed of the turbine rotor measured when the system frequency is changed from a rated frequency, and $N_N$ denotes the speed of the turbine rotor when the system frequency is the rated frequency.

3. The control method of claim 2, wherein the change ratio $M_R$ of a decreasing amount or an increasing amount of the compressed air is calculated as a negative rate or a positive rate of change, respectively, according to $$M_R = \frac{M_C - M_N}{M_N} = \frac{N_C}{N_N} - 1,$$

where Mc denotes the amount of compressed air supplied to the combustor when the system frequency is changed from the rated frequency, and $M_N$ denotes the amount of compressed air supplied to the combustor when the system frequency is the rated frequency.

4. The control method of claim 1, wherein the controlling comprises:

setting the fuel amount Fc supplied to the combustor according to a calculation of Fc=$F_N$(1+$M_R$), where $F_N$ denotes the fuel amount supplied to the combustor when the system frequency was a rated frequency, and $M_R$ denotes the change ratio of the amount of the compressed air.

5. The control method of claim 1, wherein the controlling comprises:

verifying the change ratio based on the measured amount of compressed air; and correcting the change ratio only when the estimated change ratio represents an error, the error representing the change ratio $M_R$ of a decreasing amount or the change ratio $M_R$ of an increasing amount of the compressed air, wherein the change ratio $M_R$ is calculated as a negative rate or a positive rate of change, such that a change rate $M_R$ of the compressed air amount that is less than zero indicates a decrease in the amount of compressed air and such that a change rate $M_R$ of the amount of compressed air that is greater than zero indicates an increase in the amount of compressed air.

6. A gas turbine system comprising:

a compressor configured to produce compressed air by sucking and compressing external air;

a combustor configured to produce combustion gas by combusting the compressed air and fuel;

a turbine coaxially connected to the compressor, the turbine including a rotor rotated by the combustion gas produced through the combustor and having a rotational speed proportional to a system frequency; and a controller including a sensor unit, wherein the controller is configured to:

measure the speed of the turbine rotor;

estimate a change ratio MR of an amount of compressed air supplied to the combustor depending on a change in the measured speed of the turbine rotor; and control a fuel amount Fc supplied to the combustor according to the change ratio $M_R$, wherein the controller is further configured to measure the amount of compressed air which is produced by the compressor and supplied to the combustor, to measure an inlet temperature of the compressor, and to measure a position of an inlet guide vane for inducing air to the compressor, wherein the controller is further configured to store first data that is a calculated amount of compressed air according to the inlet temperature of the compressor, to store second data that is a calculated amount of compressed air according to the position of the inlet guide vane, and to estimate the change ratio $M_R$ according to at least one of the first data and the second data, and wherein the controller is further configured to correct the change ratio $M_R$ of the amount of compressed air according to at least one of the first data and the second data.

7. The gas turbine system of claim 6, wherein the controller is further configured to:

set the fuel amount Fc supplied to the combustor according to a calculation of Fc=$F_N$(1+$M_R$), where $F_N$ denotes the fuel amount supplied to the combustor when the system frequency was a rated frequency, and $M_R$ denotes the change ratio of the amount of the compressed air;

verify the change ratio based on the measured amount of compressed air; and correct the change ratio only when the estimated change ratio represents an error, the error representing the change ratio $M_R$ of a decreasing amount or the change ratio $M_R$ of an increasing amount of the compressed air, wherein the change ratio $M_R$ is calculated as a negative rate or a positive rate of change, such that a change rate $M_R$ of the compressed air amount that is less than zero indicates a decrease in the amount of compressed air and such that a change rate $M_R$ of the amount of compressed air that is greater than zero indicates an increase in the amount of compressed air.

8. The gas turbine system of claim 6, wherein the change ratio $M_R$ of the amount of the compressed air is estimated according to $$M_R = \frac{N_C}{N_N} - 1,$$

where Nc denotes the speed of the turbine rotor measured when the system frequency is changed from a rated frequency, and $N_N$ denotes the speed of the turbine rotor when the system frequency is the rated frequency, and wherein the change ratio $M_R$ of a decreasing amount or an increasing amount of the compressed air is calculated as a negative rate or a positive rate of change, respectively, according to $$M_R = \frac{M_C - M_N}{M_N} = \frac{N_C}{N_N} - 1,$$

where Mc denotes the amount of compressed air supplied to the combustor when the system frequency is changed from the rated frequency, and $M_N$ denotes the amount of compressed air supplied to the combustor when the system frequency is the rated frequency.

* * * * *